United States Patent [19]

Hanson

[11] 4,167,773

[45] Sep. 11, 1979

[54] PHOTOFLASH LAMP ARRAY HAVING CONTOURED SHEET SHIELD

[75] Inventor: James M. Hanson, Euclid, Ohio

[73] Assignee: General Electric Company, Schenectady, N.Y.

[21] Appl. No.: 825,609

[22] Filed: Aug. 18, 1977

[51] Int. Cl.$^2$ ............................................... G03B 15/02
[52] U.S. Cl. ..................................... 362/13; 362/234; 362/248; 362/346; 362/347
[58] Field of Search ...................... 362/10, 13, 11, 14, 362/234, 248, 346, 347

[56] References Cited

U.S. PATENT DOCUMENTS 4,041,300   8/1977   Blount ..................................... 362/13

*Primary Examiner*—Stephen J. Lechert, Jr.
*Attorney, Agent, or Firm*—Norman C. Fulmer; Lawrence R. Kempton; Frank L. Neuhauser

[57] ABSTRACT

A photoflash lamp array comprising a plastic housing containing flash lamps having lead-in wires connected to a circuit board carrying switching circuitry for sequentially firing the flash lamps. A combined shield and flash indicator sheet is positioned between the circuit board and the rear of the housing and is contoured to have side portions extending along the side walls of the housing.

14 Claims, 4 Drawing Figures

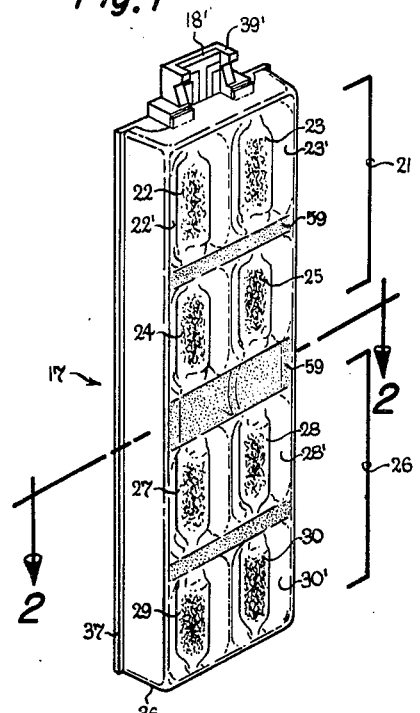
Fig. 1
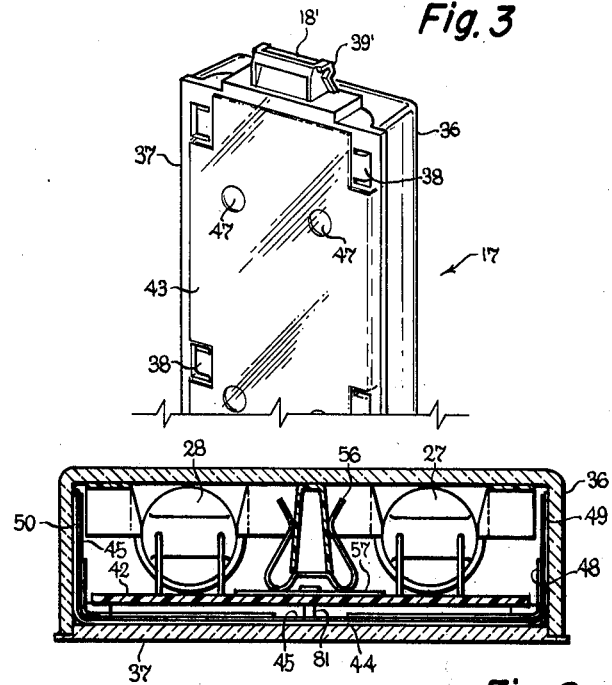
Fig. 3
Fig. 2
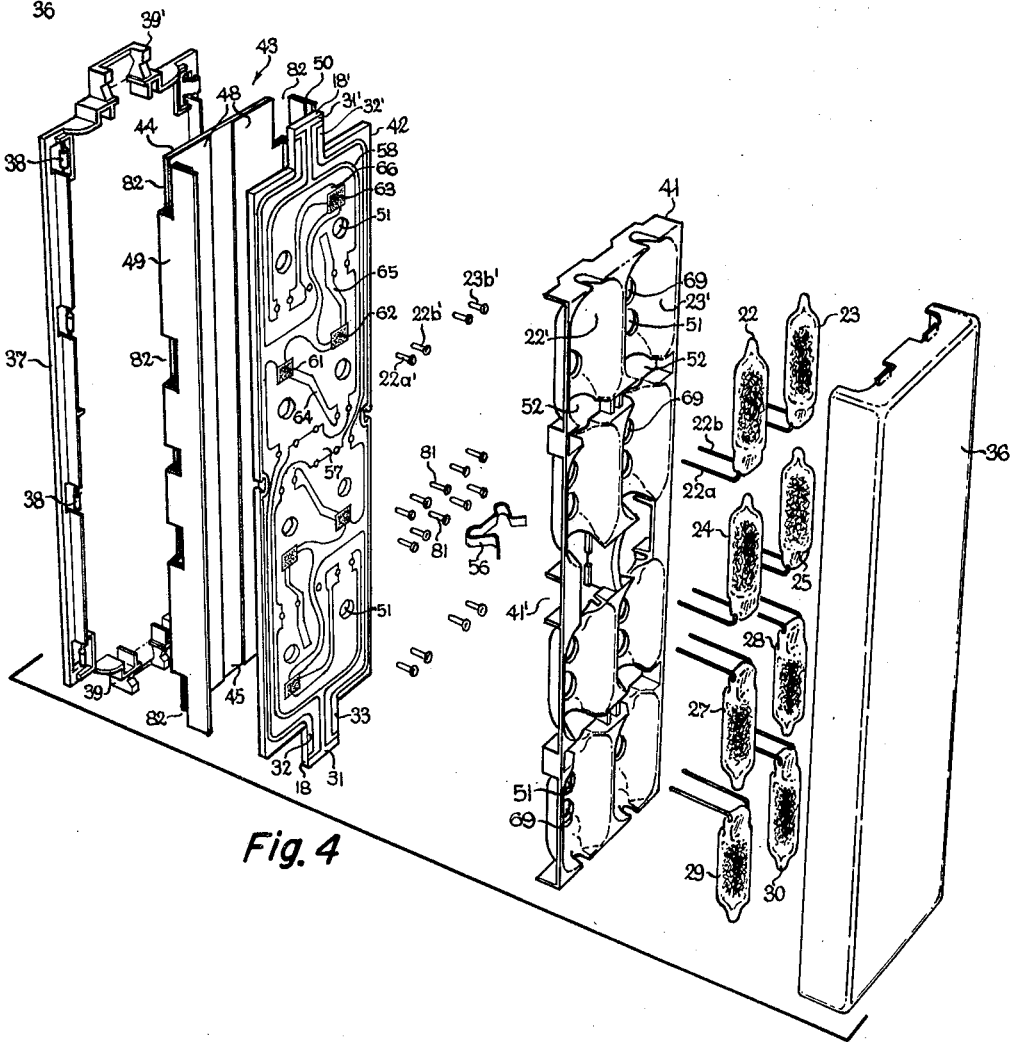
Fig. 4

PHOTOFLASH LAMP ARRAY HAVING CONTOURED SHEET SHIELD

BACKGROUND OF THE INVENTION

The invention is in the field of multiple photoflash lamp units, such as planar arrays.

U.S. Pat. No. 3,935,442 to Hanson discloses a multiple flash lamp array of the Flip Flash type comprising a plurality of flash lamps having their lead-in wires connected to a circuit board provided with switching circuitry for causing sequential flashing of the lamps, and a reflector unit is positioned between the lamps and the circuit board. The reflector unit is electrically conductive, such as by being made of metal or metal-coated plastic, and is electrically connected to an electrical "ground" portion of the circuitry on the circuit board. Thus, the reflector member functions as an electrical shield and increases the stray capacitance to ground of the electrical "ground" of the circuitry, reducing the possibility of accidental flashing of lamps by electrostatic voltage charges on a person or object touching the array, which accidental flashing is particularly prone to occur if the lamps are high voltage types requiring a firing voltage of 1000 or 2000 volts, for example, at low current. U.S. Pat. No. 4,019,043 to Blount discloses an additional feature of a metal foil shield positioned behind the circuit board and connected to electrical ground of the circuit. The metal foil is in the form of a metal coating on a paper indicia sheet which also is provided with flash indicator means for indicating which of the lamps have been flashed.

SUMMARY OF THE INVENTION

Objects of the invention are to provide an improved flash array construction, and to provide electrostatic shielding in a flash array having an open-sided reflector unit or no reflector unit.

The invention comprises, briefly and in a preferred embodiment, a multiple flash lamp array having a plurality of flash lamps in front of and connected to a circuit board having a lamp flashing circuit on a surface thereof. An electrically conductive sheetlike shield is provided behind the circuit board to reduce the possibility of accidental flashing of lamps by electrostatic voltage, which flashing tends to occur particularly when high voltage, low energy types of lamps are used in the array. The shield is provided with sides extending forwardly and flanking the flash lamps to further protect them from accidental flashing by electrostatic charges. Preferably, the shield is connected to electrically to a lead-in wire of each lamp in the array, constituting electrical ground of the circuit. A plurality of electrical terminals are provided on the array for connecting it to a socket of a camera or flash adapter, one of which terminals is shaped and arranged to be relatively more touchable than the others and is electrically connected to said shield and lead-in wire of each lamp, these members and connections constituting the common electrical portion of the circuit and having a relatively large stray capacitance to ground. By thus making one terminal more readily touchable and providing it with a relatively large stray capacitance to ground, an electrostatic charge applied to this terminal will be principally diverted through the larger stray capacitance to ground instead of passing through flash lamps in the array. Also, the shield functions to shield the circuitry and lamps from electrostatic charges.

Preferably, the shield is a sheet of electrically conductive paper, plastic, or metal foil, or a sheet of conductive coated paper, which may also function as an indicia sheet by carrying indicia such as instructions, information, etc., on its back side. Preferably, the conductive part of the shield is in touching contact against a common electrical portion of the circuit board. Also, in the preferred embodiment, plastic flash indicator strips are associated with the shield and serve as electrical insulation to prevent the shield from shorting across the lamps.

BRIEF DESCRIPTION OF THE DRAWING

FIG. 1 is a perspective view of a multiple flash lamp array in accordance with a preferred embodiment of the invention.

FIG. 2 is a cross-sectional view of FIG. 1, taken on the line 2—2 thereof.

FIG. 3 is a perspective rear view of part of the flash array.

FIG. 4 is an exploded perspective view of the flash array.

DESCRIPTION OF THE PREFERRED EMBODIMENT

A multiple flash lamp unit 17 of the planar array type and containing a plurality of electrically fired flash lamps is provided with a plug-in connector tab 18 at the lower end thereof, adapted to fit into a socket of a camera or flash adapter as shown and described in the above-referenced patents. The lamp array 17 is provided with a second plug-in connector tab 18' at the top end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind the respective flash lamps, so that as each lamp is flashed its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patents.

The general construction of the array, also disclosed in the above-referenced patents, comprises front and back housing members 36 and 37, which preferably are made of plastic and are provided with interlocking members 38 which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of aluminum-coated plastic) shaped to provide the individual reflectors 22', etc., a printed circuit board 42 provided with integral connector tabs 18 and 18', and a combined shield and indicia sheet 43 which may be provided with instructions, information, and other indicia such as flash indicators 47 located behind the respective lamps and which change color due to heat and/or light radiation from a flashing lamp, thus indicating at a glance which of the lamps have been flashed and not flashed.

The indicia sheet 43 may be of paper or thin cardboard 44 coated with a layer of metal 45, such as aluminum, on its front or inner surface, and provided with openings where the flash indicators 47 are desired, and flash indicator material 48, such as a sheet-like heat sensitive plastic material, for example biaxially oriented polypropylene, which shrinks or melts when subjected to heat or radiant energy from an adjacent flashing lamp, is positioned over the openings 43 thus effectively changing the color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over the metal coating 45 and hence over all of the flash indicator openings, or it can be in the form of two vertical strips as shown in the drawing. Window means 51 in the form of openings or transparent areas are provided through the reflector unit 41 and the circuit board 42 to facilitate radiation from flashing lamps reaching the flash indicators 47. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

In accordance with the invention, the indicia sheet shield 43 is folded to provide vertical sides 49 and 50 which extend forwardly and flank the array of flash lamps 22, etc., thus aiding in the shielding of the lamps and circuit board and permitting the reflector unit 41 to be open-sided as indicated by numeral 41' instead of having vertical sides as disclosed in the above-referenced patents. Also, in accordance with the invention, the forwardly-bent shield sides 49 and 50 permit the elimination of the reflector unit 41, whereby the front surface of the circuit board may function as a reflector for light from the lamps when flashed.

The height and width of the rectangular array are substantially greater than its thickness, and the heights and widths of the reflector member 41 and circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contracting terminals of a camera socket for applying firing voltage pulses to the array. Each tab is provided with a third terminal 33 and 33', respectively, which functions to electrically short the circuitry of the inactive lower group of lamps, when the array is plugged into a socket, as is described in the above-referenced Blount patent. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled, as is disclosed in U.S. Pat. No. 3,980,876 to Cote.

The circuit board 42 has a "printed circuit" thereon, as will be described, for causing sequential flashing of the lamps by firing voltage pluses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, in such as by means of metal eyelets 22a', 22b', etc., placed through openings in the board. The lead wires 22a, 22b, ect., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

A clip 56 is clipped onto the reflector member 41, which reflector preferably is made of metal-coated plastic, and the rear of the clip 56 rests in touching contact against an area 57 of an electrical ground circuit run 58 on the board and which includes the terminals 31 and 31' and which makes contact with one of the connector eyelets 22a', or 22b', etc., for each of the lamps 22, etc., whereby the reflector unit 41 additionally functions as an electrically grounded shield, as disclosed in the above-referenced Hanson patent.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25 and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62 and 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 4 to facilitate radiation transfer. A suitable material for the radiation switches is silver oxide dispersed in a binder such as polyvinyl resin. Another suitable radiation switch material is disclosed in U.S. Pat. No. 3,990,832 to Smialek et al. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around the other connector table 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts for example, at low current, for flashing, and they can be fired by impacting or stressing a piezoelectric element in the camera.

As shown in FIGS. 2 and 4, one or more conductor members such as eyelets 81 are positioned through openings in the circuit board at the ground-pad area 57 of the common electrical circuit run 58, with their heads in contact with the ground-pad area 57 and their other ends touching the metal foil 45 of the shield sheet 43 so that the foil is connected electrically to the common circuit run and functions as a shield to reduce the possibility of undesired accidental flashing of lamps by electrostatic voltage charges. The plastic indicator strips 48 serve as electrical insulation to prevent shorting across the lamp connection eyelets 22a', etc., by the metal foil 45. A convenient way of achieving this is to position the plastic strips 48 vertically behind the two columns of lamps, as shown, so as to be behind all of the lamp lead-in connector eyelets.

The metal foil coating 45 of the shield sheet 43 preferably extends substantially to the front edges of the sides 49, 50 thereof, and these sides 49, 50 preferably extend as far frontwardly as permitted by the depth of the array housing, so as to effectively shield the lamps and circuitry from electrostatic charges at the sides of the array and to permit the reflector unit 41 to have open sides 41', or, alternatively, to permit elimination of the reflector unit 41, as described above. Suitable cut-out areas or openings 82 are provided at the bent edges of the shield member 43 in the vicinities of the housing latch members 38 so that the shield and latch members will not interfere with each other when assembling the product.

The invention has been found to achieve its objectives of providing improved electrostatic shielding in a flash array, and to permit the use of an open-sided reflector unit, or alternatively, complete elimination of the reflector unit.

While preferred embodiments of the invention have been shown and described, various other embodiments and modifications thereof will become apparent to persons skilled in the art, and will fall within the scope of the invention as defined in the following claims.

What I claim as new and desire to secure by United States Letters Patent is:

1. A multiple flash lamp array comprising a circuit board having circuitry for sequentially firing flash lamps and a plurality of flash lamps of the electrically fired type positioned over the front of said circuit board and connected electrically to said circuitry, wherein the improvement comprises an electrically conductive shield in the form of a conductive sheet member positioned behind and substantially parallel to said circuit board, said shield being provided with integral side portions extending frontwardly of said circuit board and substantially flanking said flash lamps.

2. An array as claimed in claim 1, in which said shield is provided with a plurality of flash indicators respectively located behind said lamps.

3. An array as claimed in claim 1, in which said circuitry includes an electrical ground, and means connecting said shield to said electrical ground.

4. An array as claimed in claim 3, in which a lead-in of each of said lamps is connected to said electrical ground.

5. An array as claimed in claim 4, in which said array is provided with a pair of connector terminals arranged so that a first of said terminals is more readily touched than the second of said terminals when said array is handled, and means connecting said first terminal to said electrical ground.

6. An array as claimed in claim 1, in which said shield comprises a sheet of paper having a layer of metal on one side thereof.

7. An array as claimed in claim 6, in which said layer of metal faces toward the inside of said array.

8. An array as claimed in claim 7, in which said shield is provided with flash indicators comprising a plurality of openings through said sheet of paper and layer of metal respectively located behind said lamps, and sheet-like radiation-deformable plastic positioned over each of said openings.

9. An array as claimed in claim 8, in which said circuitry includes an electrical ground circuit run, and a conductor connected electrically to said ground circuit run and extending rearwardly of said circuit board and in contact against said shield.

10. Any array as claimed in claim 9, in which said ground circuit run is on the front surface of said circuit board, and in which said conductor comprises an eyelet inserted through said circuit board with the head thereof over and against said ground circuit run, the shank of said eyelet extending rearwardly of the circuit board and against said shield.

11. An array as claimed in claim 9, in which said lamps are arranged in two columns each having a plurality of lamps, and in which said sheet-like radiation-deformable plastic comprises two strips thereof positioned over said layer of metal respectively behind said two columns of lamps and flanking said eyelet.

12. An array as claimed in claim 1, including a reflector unit positioned behind said lamps at the front of said circuit board, said reflector unit having substantially open sides along said side portions of the shield.

13. An array as claimed in claim 1, including a substantially rectangular housing enclosing said flash lamps, said circuit board, and said shield, said housing having a pair of sides flanking said flash lamps, said circuit board, and said shield, said side portions of the shield being substantially coextensive with said sides of the housing.

14. An array as claimed in claim 13, in which said shield is provided with a pair of mutually parallel right-angle bends forming said side portions of the shield, said housing being provided with a plurality of interlocking members positioned along said bends of the shield, said shield being provided with cut-out areas along said bends to clear said interlocking members.

* * * * *